United States Patent
Atkins et al.

(10) Patent No.: US 6,396,983 B1
(45) Date of Patent: May 28, 2002

(54) FORMATION OF GRATINGS IN OPTICAL FIBERS COATED WITH UV-CURABLE POLYMER

(75) Inventors: Robert Michael Atkins, Millington, NJ (US); Arturo Hale, New York, NY (US); Francis M Houlihan, Millington; Valerie Jeanne Kuck, Upper Montclair, both of NJ (US); Richard T Olsson, Lidingo (SE); Mark Anthony Paczkowski, Andover, NJ (US); Debra Ann Simoff, Simsburby, CT (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/778,166

(22) Filed: Feb. 7, 2001

(51) Int. Cl.[7] ................................................. G02B 6/34
(52) U.S. Cl. ......................................... 385/37; 385/145
(58) Field of Search .......................... 385/37, 141, 144, 385/145

(56) References Cited

U.S. PATENT DOCUMENTS

| | | | | |
|---|---|---|---|---|
| 5,745,615 A | * | 4/1998 | Atkins et al. | 385/12 |
| 5,881,188 A | * | 3/1999 | Starovubov | 359/566 |
| 6,067,392 A | * | 5/2000 | Wakami et al. | 385/127 |
| 6,204,304 B1 | * | 3/2001 | Houlihan et al. | 359/566 |

* cited by examiner

Primary Examiner—Hung N. Ngo
(74) Attorney, Agent, or Firm—Lowenstein Sandler, PC

(57) ABSTRACT

This invention is predicated upon applicants' discovery that UV-induced gratings can be formed through polymer coatings that include conjugated double bonds and aromatic moieties. Coatings with low concentrations of aromatic-containing free-radical photoinitiators provide both reasonable curing speeds and sufficient transparency that gratings can be written through them. Moreover some of these aromatic-containing free-radical photoinitiators act synergistically with non-aromatic ketone photoinitiators. Advantageous aromatic-containing free-radical photoinitiator concentrations are in the range 0.01%–0.1% and preferably in the range 0.02% to 0.05%. Advantageous polymer coatings are acrylate-based coatings.

13 Claims, 1 Drawing Sheet

FORMATION OF GRATINGS IN OPTICAL FIBERS COATED WITH UV-CURABLE POLYMER

FIELD OF THE INVENTION

This invention relates to methods for forming gratings, such as Bragg gratings, in optical fibers and, in particular, to a method for forming UV-induced gratings in optical fibers coated with UV-curable polymer without removing the polymer.

BACKGROUND OF THE INVENTION

The dominant method for forming gratings in optical fiber is to induce the gratings in the fiber core by ultraviolet light shone through the fiber cladding. An optical fiber having a photosensitive glass core and a surrounding glass cladding is exposed to ultraviolet (UV) light having an intensity that varies periodically along the length of the fiber. The periodically varying intensity pattern is typically provided by applying a UV beam to an optical phase grating as described in U.S. Pat. No. 5,327,515 issued to Anderson et al. on Jul. 5, 1994, which is incorporated herein by reference. Alternatively, the varying intensity pattern can be provided by an amplitude mask or by interfering a pair of coherent UV beams as described in U.S. Pat. No. 4,725,111 issued to W. H. Glenn et al. on Feb. 16, 1988, which is incorporated herein by reference. In each of these conventional techniques, the source of UV light is typically a high intensity Excimer laser.

One of the most time-consuming steps in the conventional fabrication of a fiber grating is removal of the fiber polymer coating before exposure to the UV light. Glass optical fibers are very sensitive to contamination and mechanical damage. For protection, fibers are provided with polymer coatings immediately after they are drawn. Typically the freshly drawn fiber is passed through a bath of UV-curable prepolymer and then moved past a UV lamp to effect on-line curing to a protective polymer. The preferred polymers are acrylates and especially urethane acrylates.

A problem arises because polymers curable by UV light are also typically opaque to the UV light used to write the gratings. Consequently it is necessary to strip the polymer coating from the fiber prior to writing the grating. Thus an initial step in conventional grating formation is stripping the polymer coating, as by soaking the fiber in hot sulfuric acid. A new coating must be applied after the grating is formed. The coating removal and reapplication steps can consume more than half the time required to form a grating.

The desirability of eliminating these rate limiting removal and reapplication steps was noted in U.S. Pat. No. No. 5,620,495 issued to Aspell et al. on Apr. 15, 1997, which is incorporated herein by reference. Aspell et al. taught that with a proper combination of low absorbing polymer, glass and low intensity UV light, gratings can be side-written into polymer coated fibers without removing the polymer. Low UV absorbing polymers, however, are typically slow to cure and require coating thicknesses and curing processes different from conventional fiber manufacture.

A refinement of the Aspell et al. approach is set forth in U.S. Pat. No. 5,773,486 issued to Chandross et al. on Jun. 30, 1998, which is incorporated herein by reference. Chandross et al. teaches that one can make special composition acrylate based polymer coatings that are both curable by UV (250–400 nm) and are sufficiently transparent to UV in the 235–260 nm range to permit gratings to be written through the coatings. The Chandross et al. polymers differ from conventional acrylate-based coatings in that the Chandross polymers are devoid of conjugated double bonds and aromatic moieties and in that they employ aliphatic or cycloaliphatic free-radical ketone photoinitiators. The Chandross polymers may also use non-aromatic thiol synergists.

It would be advantageous to provide a method for forming UV-induced gratings in optical fibers coated with more nearly conventional acrylate polymers without removing the polymer.

SUMMARY OF THE INVENTION

This invention is predicated upon applicants' discovery that UV-induced gratings can be formed through polymer coatings that include conjugated double bonds and aromatic moieties. Coatings with low concentrations of aromatic-containing free-radical photoinitiators provide both reasonable curing speeds and sufficient transparency that gratings can be written through them. Moreover some of these aromatic-containing free-radical photoinitiators act synergistically with non-aromatic ketone photoinitiators. Advantageous aromatic-containing free-radical photoinitiator concentrations are in the range 0.01%–0.1% and preferably in the range 0.02% to 0.05%. Advantageous polymer coatings are acrylate-based coatings.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
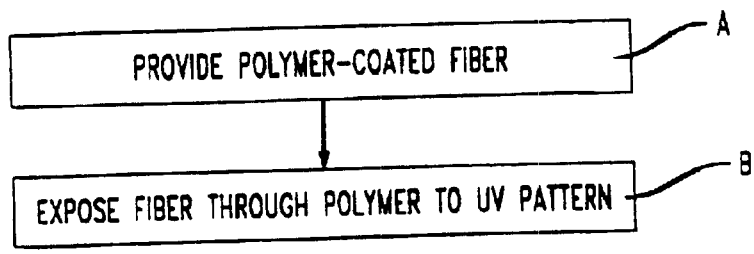
FIG. 1 is a flow diagram of the steps involved in forming a grating in polymer-coated fiber.

Referring to the drawing, FIG. 1 is a flow diagram depicting the steps in forming a grating in polymer-coated fiber. The grating can be a Bragg grating or a long period grating. As shown in block A of FIG. 1, the first step is to provide an optical fiber waveguide having a polymer coating including a low concentration of aromatic-containing free-radical photoinitiators. An optical fiber waveguide comprises an inner core of relatively high refractive index and an outer cladding. The inner core is made of UV photosensitive glass so that a grating can be written in the core by UV radiation. The cladding glass should have a low index compared to the core.

The polymer coating includes aromatic-containing free-radial photoinitiators in a low concentration in the range 0.01% by weight to 0.1%. The term "aromatic-containing photoinitiator" as used herein refers to a photoinitiator whose molecule contains at least one aromatic moiety. Typically it will contain at least one aromatic moiety directly attached to a carbonyl group or at least one aromatic moiety directly attached to a titanium atom. Preferably the polymer coating is an acrylate-based polymer having aromatic-containing free-radical photoinitiators in the range 0.02% by weight to 0.05%. The free-radical photoinitiators can be commercially available photoinitiators, but the minimum concentrations recommended by the manufacturers are 5 to 120 times larger than the low concentrations used in this process.

Advantageously, the fiber is sensitized to UV radiation by treating the fiber with deuterium $D_2$. This sensitization preferably involves placing the fiber in a $D_2$ gas environment, advantageously at an elevated pressure and temperature, so that $D_2$ will diffuse through the polymer and the cladding into the core. Typical $D_2$ treatment conditions are 3500 psi, 50°–70° C. for 3 days. The treatment enhances the sensitivity of the UV photosensitive core so that the grating can be written by lower intensity UV.

Figure 2:
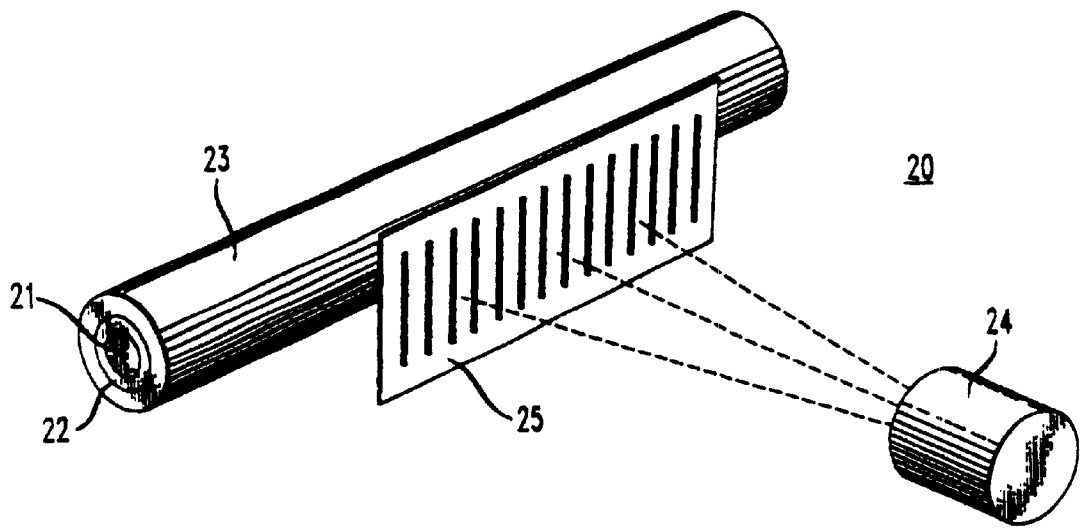
FIG. 2 is a schematic partial cross section showing an the arrangement used in forming a grating.

FIG. 2, which shows typical apparatus for practicing the method, includes a coated optical fiber 20 comprising a core 21, a cladding 22 surrounding the core, and an outer polymer coating 23. The core 21 is typically germanosilicate glass and the cladding is typically undoped silica.

Advantageous polymer coatings are based on aliphatic acrylate oligomers and monomers incorporating aromatic-containing free-radical photoinitiators which, surprisingly, can be UV-cured at reasonable speeds (greater than 1 m/s) on an optical fiber draw tower but are also sufficiently transparent to allow UV penetration for forming a grating in the core.

Preferred aromatic-containing free radical photoinitiators that meet these criteria belong to the family of α-amino-acetophenone derivatives, especially those with strongly electron-donating substituents such as alkylthio-, dialklyamino- or morpholino- at the 4-position of the benzoyl moiety. This family of photoinitiators has very high initiating efficiency, and the aforementioned electron-donating substituents induce a red-shift of the main absorption from the 250 nm region into the region above 300 nm. Two specific photoinitiators from this family are 2-benzyl-2-N,N-dimethylamino-1-(4-morpholinophenyl)-1-butanone (Irgacure 369), and 2-methyl-1-[4-(methylthio)phenyl]-2-morpholinopropanone-1 (Irgacure 907). Both are available from Ciba Speciality Chemicals, Tarrytown, N.Y. The manufacturer's suggested concentration ranges for these compounds are 0.5–4% and 1–6%, respectively. The extinction coefficients of these photoinitiators at different wavelengths are shown below, together with two of the most commonly used photoinitiators for comparison (these specific wavelengths coincide with the emission lines of mercury vapor lamps commonly used for UV-curing) (Source: "Photoinitiators for UV Curing—Key products Selection Guide, Ciba Speciality Chemicals, Pub. #A-8055M49).

| Extintion Coefficients (ml/g cm in MeOH solutions at room temperature). | | | | | |
|---|---|---|---|---|---|
| Photoinitiator | 254 nm | 302 nm | 313 nm | 365 nm | 405 nm |
| Irgacure 369 | 7,470 | 35,870 | 48,540 | 7,858 | 280 |
| Irgacure 907 | 3,936 | 60,630 | 56,410 | 466 | |
| Irgacure 184 | 33,170 | 580 | 435 | 89 | |
| Darocur 1173 | 40,640 | 822 | 564 | 74 | |

Irgacure 369 and Irgacure 907 have much lower absorbances at 254 nm than conventionally preferred photoinitiators such as Irgacure 184 and Darocur 1173. On the other hand, 369 and 907 are efficient photoinitiators in that they have strong absorbances at other mercury emission wavelengths. As can be seen, 369 and 907 have an extinction coefficient at 254 nm of less than 20,000 ml/g cm and an extinction coefficient greater than 20,000 ml/g cm for at least one wavelength greater than 270 nm.

Advantageously, the UV-curable polymer exhibits at least 85% conversion of reactive groups upon exposure to a UV radiation dose of 5000 $mJ/cm^2$. Preferably it exhibits at least 70% conversion upon exposure to a dose of 200 $mJ/cm^2$. Also advantageously the polymer when cured has a transmittance of at least 40% per 25 micrometer thickness at a wavelength of 256 nm.

We have discovered that, surprisingly, coatings based on aliphatic acrylate oligomers and monomers incorporating aromatic-containing free-radical photoinitiator concentrations (Irgacure 369 or Irgacure 907) as low as 0.01% can be adequately cured at reasonable speeds on an optical fiber draw tower. In addition, these coatings are transparent enough in the 248–260 nm region to allow enough UV radiation to penetrate through them to record gratings on a germanium-doped silica core. Although Irgacure 369 is more efficient than Irgacure 907 if they are used separately, a combination of both photoinitiators is even more efficient, because their different absorbance peaks allow them to tap more efficiently the different wavelengths emitted by the curing lamp. Surprisingly, a low enough concentration of Irgacure 184 would also provide transparency and effect cure of the coating (even at levels 50 times smaller than the minimum recommended by the manufacturer). However, Irgacure 907 or Irgacure 369 are preferred because of their lower absorbance around 250 nm and their higher cure efficiency at low concentrations.

We have also discovered that these photoinitiators exhibit synergistic behavior with aliphatic ketones. In particular, they exhibit strong synergistic behavior with low-volatility cycloaliphatic ketones, such as 1-adamantyl methyl ketone or 1-acetylcyclohexanol. Formulations containing, for example, 0.02% Irgacure 369 and 3% adamantyl methyl ketone show significantly improved cure characteristics as compared to either photoinitiator alone.

Referring back to FIG. 1, Block B shows that the second step is to direct through the polymer and cladding, a pattern of UV radiation corresponding to the desired grating. Successive radiation intensity peaks are spaced apart by the desired grating spacing.

As shown in FIG. 2, the grating pattern 19 along the fiber 20 can be defined by a mask 25 such as an amplitude mask or a phase mask. UV light from a laser 24 passes through mask 25, the polymer coating 23 and the cladding 22 to write a pattern 19 of index changes along the photosensitive core 21. Alternatively, the pattern can be defined by two interfering beams of UV radiation. The UV radiation should be at a sufficiently low intensity that it does not seriously damage the polymer coating and sufficiently large to write the grating.

The invention can now be better understood by consideration of the following specific examples.

COMPARISON EXAMPLE

A commercially formulated UV-curable optical fiber coating (Borden D-Lux 100 secondary coating, Borden Chemical, Cincinnati, Ohio) was placed between two quartz disks (25 mm diameter, $1/16^{th}$ inch thick each) using a 25 micron teflon spacer between the disks to define the film thickness. The sample was cured under a 200 W mercury lamp; the dose employed was 5,000 J/cm². The transmission of light through the cured film was measured using a UV spectrometer. The film transmitted 0.03% of the light at 256 nm.

Example 1

Several UV curable coatings were prepared by blending the components listed in table 1.1. Photomer 6210 (Cognis Corp., Ambler, Pa.) is an aliphatic urethane-acrylate oligomer. Each sample was placed between quartz disks as explained in Comparative Example 1. A near infrared spectrum (NIR) of each unreacted sample was obtained. After a dose 200 mJ/cm², another NIR was obtained. The sample was then cured to a cumulative dose of 5,000 mJ/cm², after which both the NIR and UV spectra were measured.

TABLE 1.1

Coatings Compositions

| Sample Name | Component | Amount |
|---|---|---|
| 016A | Photomer 6210(Cognis) | 98 |
| | Hexanediol diacrylate | 2 |
| | Irgacure 369 | 0.05 |
| 036 | Photomer 6210 | 98 |
| | Hexanediol diacrylate | 2 |
| | Irgacure 369 | 0.02 |
| 042A | Photomer 6210 | 98 |
| | Hexanediol diacrylate | 2 |
| | Irgacure 184 | 0.05 |
| 042B | Photomer 6210 | 99.2 |
| | Hexanediol diacrylate | 0.8 |
| | Irgacure 184 | 0.02 |
| 074 | Photomer 6210 | 98 |
| | Hexanediol diacrylate | 2 |
| | Irgacure 369 | 0.02 |
| | Adamantyl Methyl Ketone | 3.3 |
| 075 | Photomer 6210 | 98 |
| | Hexanediol dicrylate | 2 |
| | Adamantyl Methyl Ketone | 3.3 |

The conversion (extent of reaction) was calculated by following the disappearance of the acrylate CH=CH$_2$ peak at 6163 cm$^{-1}$. The results are shown in table 1.2.

TABLE 1.2

NIR and UV results

| Sample name | Conversion after 200 mJ/cm² | Conversion after 5000 mJ/cm² | % transmittance at 256 nm |
|---|---|---|---|
| 016A | 0.85 | 0.94 | 45 |
| 036 | 0.75 | 0.88 | 54 |
| 042A | 0.18 | 0.89 | 57 |
| 042B | 0.00 | 0.87 | 53 |
| 074 | 0.88 | 0.98 | 59 |
| 075 | 0.85 | 0.98 | 59 |
| Borden DLUX 100 (Comparative Ex. 1 | 0.90 | 0.96 | 0.03 |

All the samples in Example 1 have a reasonable degree of transparency at 256 nm, and they are all mostly cured upon exposure to a 5,000 mJ/cm² dose. However, the results after 200 mJ/cm² show that formulations 042A and 042B are much slower to cure than 016A, 036, 074 or 075. For a high speed draw operation, one of the latter formulations would be preferred. It is also noted that commercially available coating formulations such as Borden DLUX 100 are practically opaque at 256 nm.

Example 2

An optical fiber with a high concentration of germanium-oxygen deficiency centers (GODC) was drawn and coated with coating 016A. The high GODC increases the photosensitivity of the fiber core. The thickness of the coating was 75 microns. The fiber was subjected to the standard sensitizer loading treatment (e.g. 4 days at 50° C. in 295 atmospheres of deuterium). A Bragg grating was written in the core through the polymer coating using a phase mask, a 15 cm cylindrical lens and 40 mW of 257 nm CW laser light from a frequency-doubled Ar ion laser. The grating was scanned over 1 cm in 80 seconds. A very clean grating (good spectral shape, no side lobes) was written with a strength of 0.6 dB (13% reflector). The grating refractive index modulation was $\Delta n=2\times10^{-5}$.

Example 3

The same preform of Example 2 was drawn with coating 036 and subjected to the same sensitizer loading treatment. The thickness of the coating was 50 microns. A grating was written through the coating using a phase mask and 0.5 mW of a pulsed excimer pumped dye laser at 250 nm and a repetition rate of 1 Hz. A grating refractive index modulation of $\Delta n=1.8\times10^{-4}$ was achieved after 500 seconds.

Example 4

A standard commercial single mode fiber preform (Lucent Technologies 3D') was drawn with coating 036 and subjected to the standard sensitizer loading treatment. The thickness of the coating was 35 microns. A grating was written through the coating using a phase mask and 3 mW of a pulsed excimer pumped dye laser at 250 nm and a repetition rate of 5 Hz. A grating refractive index modulation of $\Delta n=5\times10^{-5}$ was achieved after 50 seconds.

It is to be understood that the above-described embodiments are illustrative of only a few of the many possible specific embodiments, which can represent applications of the principles of the invention. Numerous and varied other arrangements can be readily devised by those skilled in the art without departing from the spirit and scope of the invention.

What is claimed:

1. A method of forming a grating in an optical fiber comprising the steps of:

providing a length of optical fiber having a cladding and a photosensitive core;

coating the optical fiber with a UV-curable polymer; and without removing the polymer, exposing the core through the polymer to a pattern of ultraviolet radiation to form an optical grating in the core; the polymer containing a concentration of aromatic-containing free-radical photoinitiators in the range 0.01%–0.1% by weight.

2. The method of claim 1 wherein the concentration of aromatic-containing free-radical photoinitiators is in the range 0.02%–0.05% by weight.

3. The method of claim 1 wherein the aromatic-containing free-radical photoinitiators belong to the family of α-amino-acetophenone derivatives.

4. The method of claim 1 wherein the aromatic-containing free-radical photoinitiators comprise benzoyl moieties having strongly electron-donating substituents at the 4-position.

5. The method of claim 1 wherein the UV-curable polymer exhibits at least 85% conversion of reactive groups upon exposure to a UV radiation dose of 5000 mJ/cm$^2$.

6. The method of claim 1 wherein the UV-curable polymer exhibits at least 70% conversion of reactive groups upon exposure to a UV radiation dose of 200 mJ/cm$^2$.

7. The method of claim 1 wherein the UV-curable polymer coating when cured has a transmittance of at least 40% per 25 micrometer thickness at a wavelength of 256 nm.

8. The method of claim 1 wherein the aromatic-containing free-radical photoinitiators comprise 2-benzyl-2-N,N-dimethylamino-1-(4-morpholinophenyl)-1-butanone or 2-methyl-1-[4-(methylthio)phenyl]-2-morpholinopropanone-1.

9. The method of claim 1 wherein the UV curable polymer comprises acrylate groups.

10. An optical fiber grating comprising:

a length of optical fiber including a fiber grating, the fiber having a UV-curable polymer coating over the grating, the polymer containing a concentration of aromatic-containing free-radical photoinitiators in the range 0.01%–0.1% by weight.

11. The optical fiber grating of claim 10 wherein the concentration of aromatic-containing free-radical photoinitiators is in the range 0.02%–0.05%.

12. The optical fiber grating of claim 10 wherein the aromatic-containing free-radical photoinitiators belong to the family of α-amino-acetophenone derivatives.

13. The optical fiber grating of claim 10 wherein the UV-curable polymer comprises acrylate groups.

* * * * *